US009025760B1

(12) United States Patent
Pettay et al.

(10) Patent No.: US 9,025,760 B1
(45) Date of Patent: *May 5, 2015

(54) APPARATUS AND METHOD FOR CONNECTING A TRANSLATOR AND A CUSTOMER

(75) Inventors: Mark J. Pettay, Omaha, NE (US); Myron P. Sojka, Logan, IA (US); Hendryanto Rilantono, Omaha, NE (US); Mark Steve Jarzynka, Omaha, NE (US); Gregory Stuart Cardin, Omaha, NE (US); Bernard Roubaud, Castelnau le lez (FR)

(73) Assignee: West Corporation, Omaha, NE (US)

( * ) Notice: Subject to any disclaimer, the term of this patent is extended or adjusted under 35 U.S.C. 154(b) by 502 days.

This patent is subject to a terminal disclaimer.

(21) Appl. No.: 13/373,713

(22) Filed: Nov. 28, 2011

Related U.S. Application Data

(63) Continuation-in-part of application No. 13/157,660, filed on Jun. 10, 2011, now Pat. No. 8,520,833.

(51) Int. Cl.
*H04M 3/42* (2006.01)
*H04M 3/00* (2006.01)
*H04M 5/00* (2006.01)
*H04M 3/56* (2006.01)

(52) U.S. Cl.
CPC ..................... *H04M 3/562* (2013.01)

(58) Field of Classification Search
CPC ................. H04M 2203/2061; H04M 2242/12; H04M 3/42; H04M 3/56; H04M 3/564; H04M 3/565; H04M 3/566; H04M 3/567; H04M 3/568; H04M 3/42221; H04M 7/006; H04N 7/15; H04N 7/146; H04L 12/18
USPC ............. 379/265.01, 265.02, 265.03, 265.04, 379/265.05, 265.06, 265.07, 265.08, 379/265.09, 265.1, 265.11, 265.12, 265.13, 379/265.14, 266.01, 266.02, 266.03, 379/266.04, 266.05, 266.06, 266.07, 379/266.08, 266.09, 266.1, 90.01, 93.01, 379/93.21, 157, 158, 201.01, 202.01, 379/207.01; 370/259, 260, 261, 262; 455/414.1, 416
See application file for complete search history.

(56) References Cited

U.S. PATENT DOCUMENTS

| | | | | |
|---|---|---|---|---|
| 5,392,343 | A * | 2/1995 | Davitt et al. ............. | 379/265.12 |
| 6,542,595 | B1 * | 4/2003 | Hemzal .................. | 379/201.03 |
| 2003/0176995 | A1 * | 9/2003 | Sukehiro .................. | 704/2 |
| 2007/0064915 | A1 * | 3/2007 | Moore et al. ............. | 379/265.12 |
| 2007/0160188 | A1 * | 7/2007 | Sharpe et al. ............. | 379/265.01 |
| 2009/0234635 | A1 * | 9/2009 | Bhatt et al. ............... | 704/2 |
| 2010/0120404 | A1 * | 5/2010 | Bernal .................. | 455/417 |
| 2010/0135478 | A1 * | 6/2010 | Wald et al. ............... | 379/202.01 |
| 2010/0150331 | A1 * | 6/2010 | Gitelis et al. ............. | 379/202.01 |
| 2010/0198580 | A1 * | 8/2010 | Klinefelter et al. ............... | 704/3 |
| 2011/0224970 | A1 * | 9/2011 | Bernal ............................. | 704/8 |

* cited by examiner

*Primary Examiner* — Khai N Nguyen

(57) ABSTRACT

An apparatus, method, and computer-program are provided to receive a request to connect a translator to a conference call holding area, and transmit a request to the translator for a personal identification number prior to connecting the translator to the conference call holding area. Upon verification of the person identification number, the translator is connected to the conference call holding area.

6 Claims, 5 Drawing Sheets

APPARATUS AND METHOD FOR CONNECTING A TRANSLATOR AND A CUSTOMER

RELATED APPLICATION INFORMATION

This application is a Continuation-in-Part of U.S. application Ser. No. 13/157,660, now U.S. Pat. No. 8,520,833 filed Jun. 10, 2011, entitled "Global Interpreter/Translation Services via Conference Bridge", herein incorporated by reference.

FIELD

The present invention relates to an apparatus and method for connecting a translator and, more particularly, to an apparatus and method for connecting a translator and a customer.

BACKGROUND

Generally, when a customer speaking a foreign language calls a call center, the customer presumes the agent answering at the call center speaks the same language as the customer. However, there may be times when the customer calling and the call center agent speak two different languages. In those situations, a translator is needed to interpret between the call center agent and the customer

SUMMARY

Certain embodiments of the present invention may provide solutions to the problems and needs in the art that have not yet been fully identified, appreciated, or solved by current translation service systems.

In accordance with an embodiment of the present invention, a computer-implemented method is provided. The method includes receiving a request to connect a translator to a conference call holding area. The method also includes transmitting a request to the translator for a personal identification number prior to connecting the translator to the conference call holding area, and connecting the translator in the conference call holding area.

In another embodiment of the present invention, an apparatus is provided. The apparatus includes a processor and memory having instructions stored thereon. The instructions are configured to cause the processor to receive a request to connect a translator to a conference call holding area, and transmit a request to the translator for a personal identification number prior to connecting the translator to the conference call holding area. The processor also connects the translator in the conference call holding area.

In yet another embodiment of the present invention, a computer program is provided. The computer program is embodied on a computer-readable medium, and is configured to cause the processor to receive a request to connect a translator to a conference call holding area, and transmit a request to the translator for a personal identification number prior to connecting the translator to the conference call holding area. The processor also connects the translator in the conference call holding area.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures.

DETAILED DESCRIPTION OF THE EMBODIMENTS

It will be readily understood that the components of the invention, as generally described and illustrated in the figures herein, may be arranged and designed in a wide variety of different configurations. Thus, the following detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One or more embodiments described herein pertain to an apparatus and/or method that allows a translator to connect to a customer prior to joining a conference call. For example, a translator may be placed in a holding area such that when a customer calls the conference center, the customer can have the option to select a translator prior to starting the conference call with another party.

Figure 1:
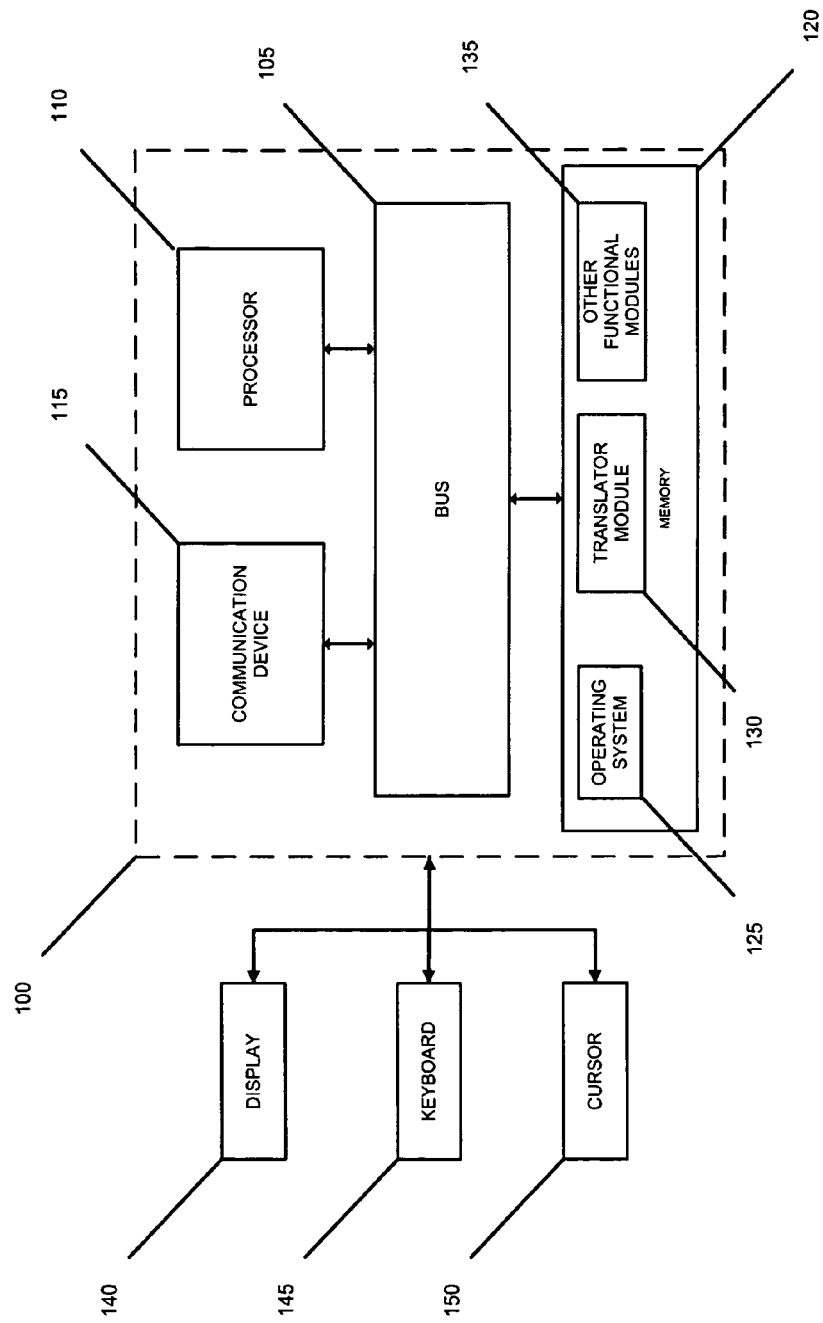
FIG. 1 illustrates a block diagram of a system with a translation service, in accordance with an embodiment of the present invention.

FIG. 1 illustrates a block diagram of a system 100, in accordance with an embodiment of the present invention. System 100 may include a bus 105 or other communication mechanism that can communicate information and a processor 110, coupled to bus 105, that can process information. Processor 110 can be any type of general or specific purpose processor. System 100 may also include memory 120 that can store information and instructions to be executed by processor 110. Memory 120 can be comprised of any combination of random access memory ("RAM"), read only memory ("ROM"), static storage such as a magnetic or optical disk, or any other type of computer readable medium. System 100 may also include a communication device 115, such as a network interface card, that may provide access to a network.

The computer readable medium may be any available media that can be accessed by processor 110. The computer readable medium may include both volatile and nonvolatile medium, removable and non-removable media, and communication media. The communication media may include computer readable instructions, data structures, program modules, or other data and may include any information delivery media.

Processor 110 can also be coupled via bus 105 to a display 140, such as a Liquid Crystal Display ("LCD"). Display 140 may display information to the user. A keyboard 145 and a cursor control unit 150, such as a computer mouse, may also be coupled to bus 105 to enable the user to interface with system 100.

According to one embodiment, memory 120 may store software modules that may provide functionality when executed by processor 110. The modules can include an operating system 125 and a translation service module 130, as well as other functional modules 135. Operating system 125 may provide operating system functionality for system 100. Because system 100 may be part of a larger system, system 100 may include one or more additional functional modules 135 to include the additional functionality.

Figure 2:
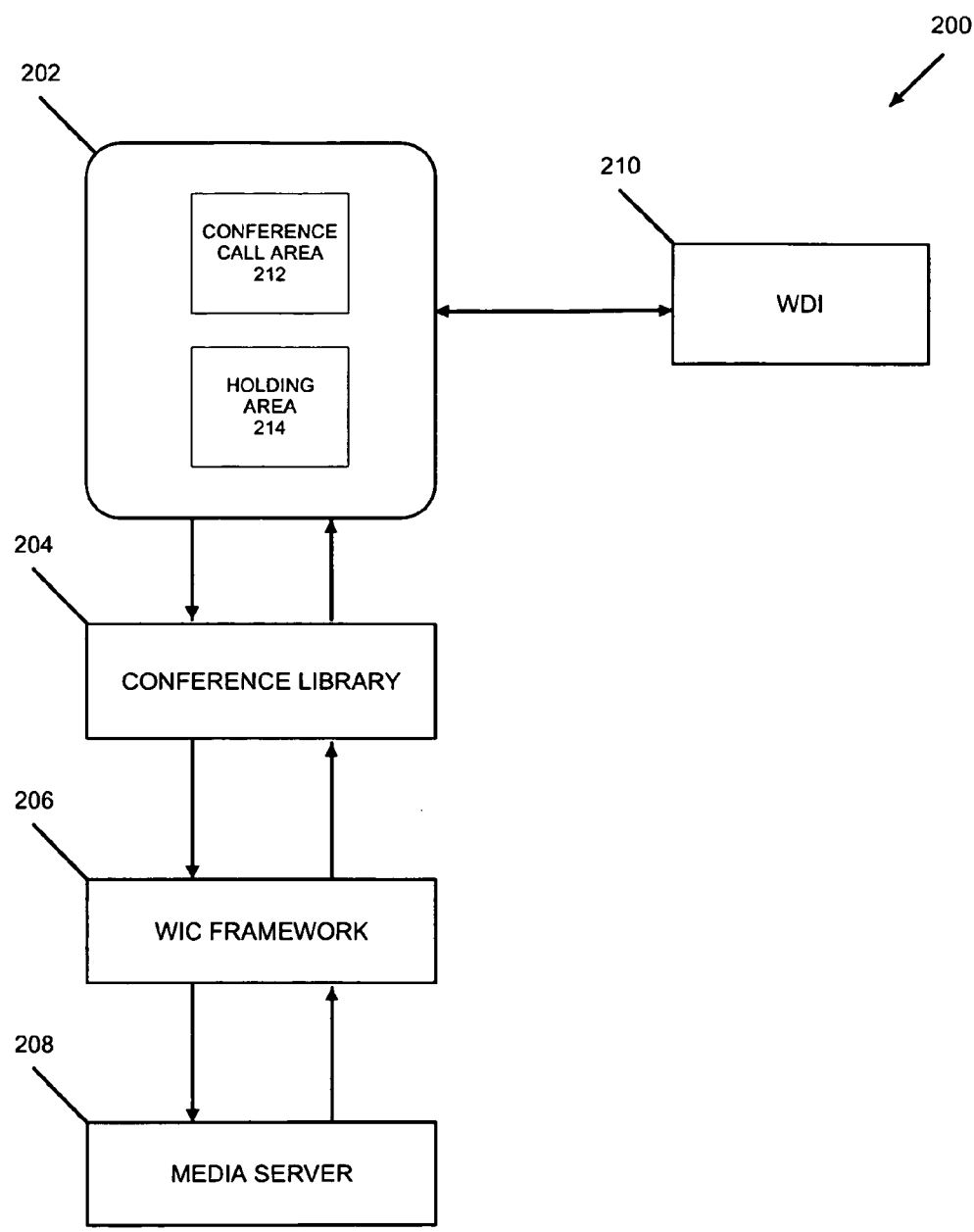
FIG. 2 illustrates a system that connects an interpreter with a caller, in accordance with an embodiment of the present invention.

FIG. 2 illustrates a system 200 that connects an interpreter with a caller, in accordance with an embodiment of the present invention. System 200 includes a translator module 202, a conference library module 204, a WIC framework module 206, media server module 208, and a WDI module (or verification unit) 210. Translator module 202 includes a conference call area 212 and a holding area 214, and is operatively connected to WDI module 210.

In this embodiment, a translator (or interpreter) such as a Spanish interpreter connects to translator module 202 by dialing a dedicated or non-dedicated number. Translator module 202 transmits a welcome message and prompts the translator to enter a Personal Identification Number (PIN). The PIN can be numerical and/or alphanumerical and can be four digits, five digits, etc.

Upon receipt of the PIN, translator module 202 transmits a request to WDI module 210 in order to validate the translator's PIN. WDI module 210 queries a database to determine whether the translator's PIN is valid. If the PIN is valid, translator module 202 receives a validation message from WDI module 210 and transmits a registration message to WDI module 210 in order to register the translator. If the PIN is invalid, translator module 202 transmits a message to the translator that the PIN enter was invalid and requests the translator to reenter the PIN. It should be appreciated that translator module 202 may include a mechanism to allow the translator to reenter the PIN a predetermined number of times before blocking the translator from system 200.

Once the translator is registered in WDI module 210, translator module 202 places the translator in a holding area 214 with music. Translator module 202 also transmits a message instructing the translator to wait in holding area 214 until a customer is connected to the translator.

For example, when a customer dials a dial in number to connect to a customer agent, the customer receives a welcome message from translator module 202. Translator module 202 then transmits a message requesting the customer to enter a conference PIN. Once the customer enters the PIN, translator module 202 prompts the customer to select an interpreter language. For example, the customer is requested to select "1" for Spanish, "2" for English, "3" for French, etc.

When, for example, the customer selects "1" for Spanish, translator module 202 transmits a message to the customer indicating that translator module 202 is connecting the customer to the Spanish translator. During this time, translator module 202 transmits a request for a translator to WDI module 210 identifying the Spanish translator, and receives a call-ID message of the Spanish interpreter from WDI module 210.

Translator module 202 transmits a message to the Spanish translator indicating that the translator is being connected to the customer. In order to connect the Spanish translator to the customer, translator module 202 transmits a conference start message to WDI module 210 in order to start the conference call. As a result, the customer and the translator are connected to the conference call (e.g., conference call area 212) and the translator and customer can speak with each other.

If the customer disconnects from the conference call, conference module 202 places the translator into the holding area 214 and informs the translator accordingly. Translator module 202 also transmits a message to WDI module 210 to end the conference call between the customer and the translator. In an alternative embodiment, if the translator disconnects from the conference call, translator module 202 transmits an option menu to the customer and informs the customer that the translator is disconnected from the call and is requested to enter the interpreter language, if needed. Also, translator module 202 instructs WDI module 210 to end the conference call and to unregister the translator.

Figure 3:
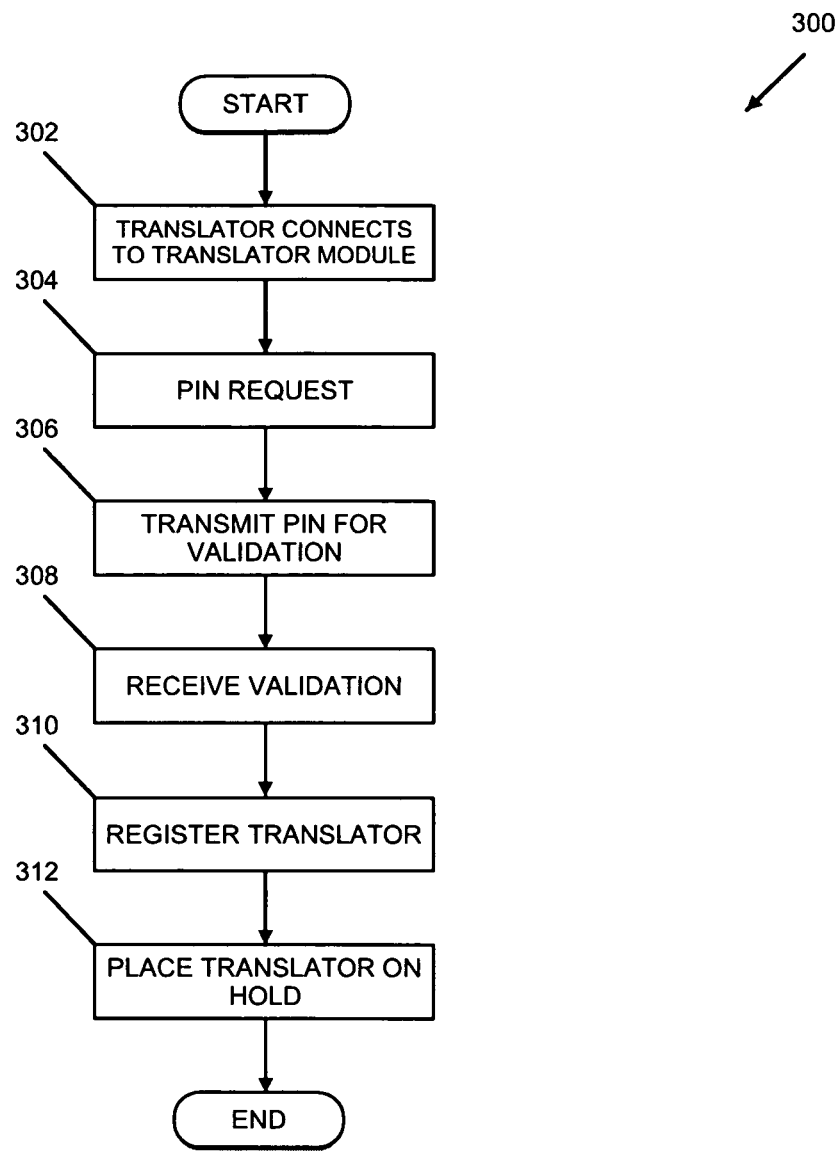
FIG. 3 illustrates a method for a translator to connect to a holding area, in accordance with an embodiment of the present invention.

FIG. 3 illustrates a method 300 for a translator to connect to a holding area, such as holding area 214, in accordance with an embodiment of the present invention. At 302, a translator connects to a translator module and the system plays a welcome message to the translator. The translator module then requests that the translator enter a PIN at 304. At 306, the translator module transmits a request to the WDI module in order to validate the PIN, and receives a validation message at 308. In response to the validation message, the translator module requests that the WDI module register the translator at 310 and places the translator into a holding area at 312.

Figure 4:
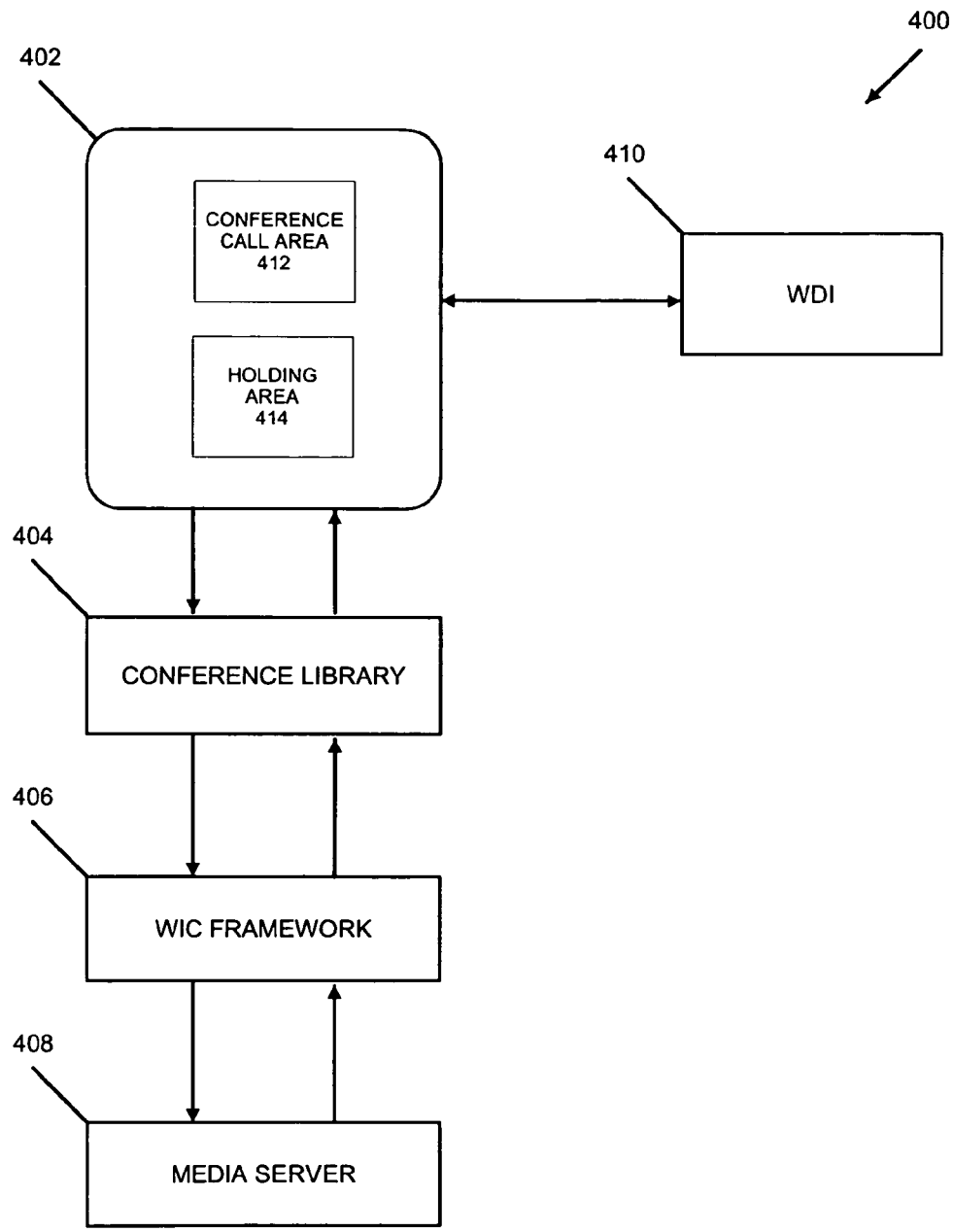
FIG. 4 illustrates a system that connects an interpreter with a caller, in accordance with an embodiment of the present invention.

FIG. 4 illustrates a system 400 that connects an interpreter with a caller, in accordance with an embodiment of the present invention. FIG. 4 includes similar modules to those shown in FIG. 2. In this embodiment, a translator connects to system 400 by dialing a phone number and a welcome message is played. Translator module 402 requests that the translator enter a PIN and, upon receipt of the PIN, translator module 402 transmits a request to WDI module 410 in order to validate the translator. If the PIN is valid, then translator module 402 receives a confirmation from WDI module 410 that the PIN associated to the translator is valid and places the translator in a holding area 414.

When the customer dials a number to connect with a customer agent, the customer is connected to system 400, at which point a welcome message is played. Translator module 402 requests that the customer enter a conference PIN and, upon receipt of the conference PIN, translator module 402 prompts the customer to select the language, e.g., "1" for Spanish, "2" for French, etc.

When the customer selects the language, translator module 402 informs the customer that a translator is being connected to the conference call. In this embodiment, translator module 402 transmits a request for a translator message to WDI module 410 and receives a caller ID of the translator for the language selected by the customer.

Translator module 402 transmits a message to the translator indicating that a customer is being connected, and transmits a message to WDI module 410 to begin the conference call with the customer. Once connected, the customer and translator speak with each other, and the customer requests that the translator connect to a participant. The request includes a name and phone number of the participant in some embodiments.

The translator then dials "0", for example, and is prompted to enter the telephone number of the participant. The entered telephone number is replayed to the translator for confirmation and is connected to the participant. When the participant answers the call, the participant is prompted with a welcome message and is informed that the participant is being connected to a translator.

Once connected, the participant, the customer, and translator can speak with one another. Once the translator hangs up, translator module 402 provides the customer with an option menu and is informed that the translator has been disconnected from the conference. Translator module 402 also disconnects the participant from the conference call by transmitting a message to WDI module 410 to end the conference call, as well as a message to unregister the translator from the conference call.

Figure 5:
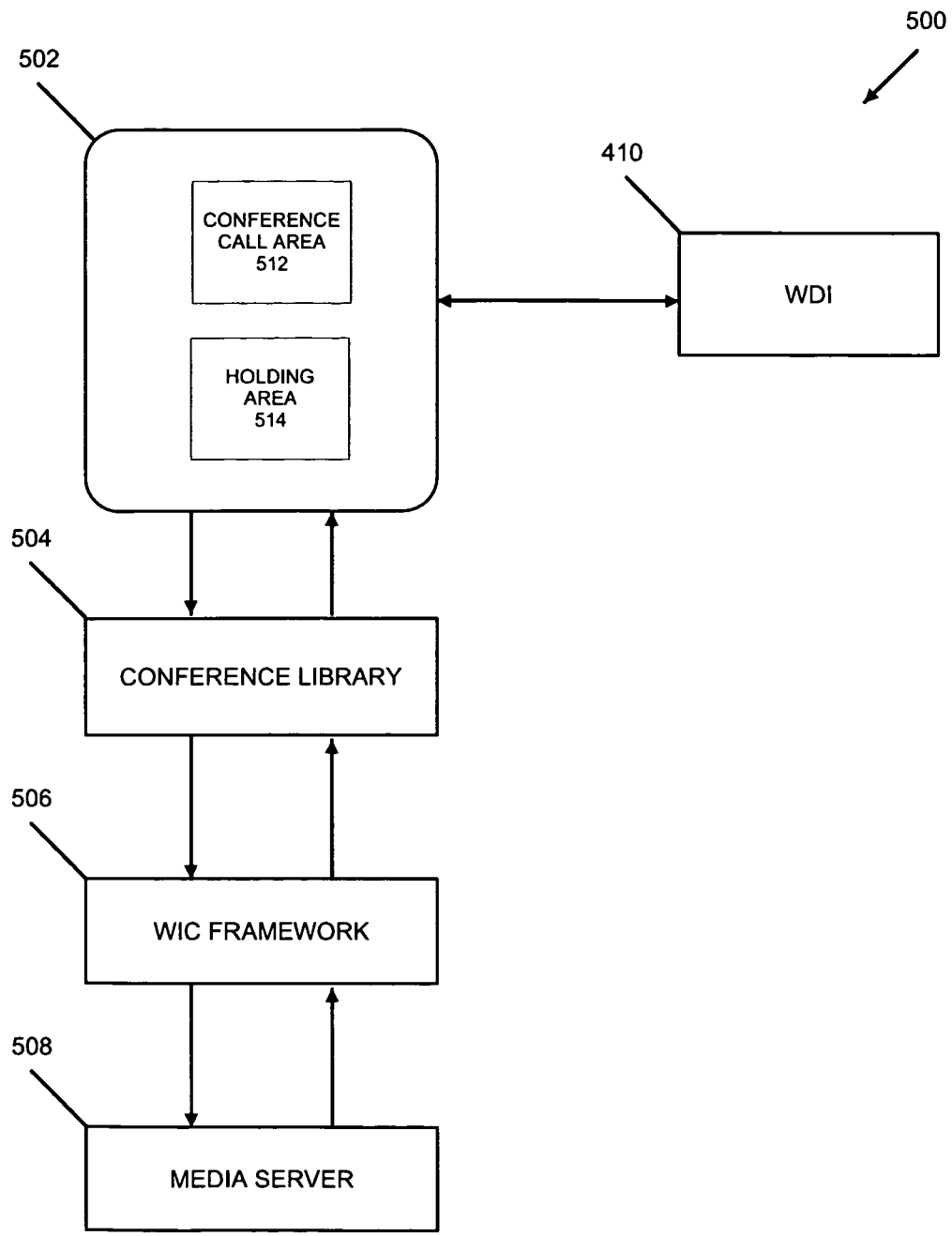
FIG. 5 illustrates a system that connects a translator to a customer, in accordance with an embodiment of the present invention.

FIG. 5 illustrates a system 500 that connects a translator to a customer, in accordance with an embodiment of the present invention. Similar to FIG. 2, FIG. 5 includes similar module to those shown in FIG. 2.

In this embodiment, when a customer connects to system 500, a welcome message is played. Translator module 502 then prompts the customer to enter a conference PIN. Upon receipt of the PIN, translator module 502, for example, prompts the customer to enter a translator language. When the translator language is received from the customer, translator module 502 transmits a message to WDI module 510 to request a translator for the customer. If there is no translator available, translator module 502 receives a response from WDI module 510 that a translator is not available. The response also includes a phone number of a translator for the customer to connect with.

Translator module 502 connects to the translator and informs the customer that the customer is being connected to a translator. When the translator picks up, the translator is provided with a welcome message and is informed that the translator is being connected to the customer. For instance, translation module 502 transmits a message to WDI module 510 to start or begin the conference call between the customer and translator. As a result, the translator and customer are able to speak with each other.

If the customer hangs up, then translator module 502 informs the translator of the customer's action and disconnects the translator from the conference by transmitting a message to WDI module 510. If, however, the translator hangs up, then translator module 502 informs the customer of the translator's action and is requested to enter a language for translation. Also, translator module 502 transmits a message to WDI module 510 to end the conference call between the translator and the customer.

The method steps shown in FIG. 3 may be performed, at least in part, by a computer program, encoding instructions for a nonlinear adaptive processor to cause at least the methods described in FIG. 3 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the method described in FIG. 3, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
  receiving a request to connect a translator to a conference call holding area;
  transmitting a request to the translator for a personal identification number prior to connecting the translator to the conference call holding area; and
  receiving a message comprising the personal identification number from the translator;
  transmitting a request for verification to a verification unit in order to verify the translator; and
  receiving a verification from the verification unit;
  receiving a message from a customer to connect to a conference call; and
  requesting that the customer select a language in order to select the translator;
  based on the selected language, determining whether the translator is available among a plurality of translators;
  connecting the translator in the conference call holding area;
  when the translator is not available, transmitting a message to the customer to inform the customer that the translator is not available,
  wherein the message comprises a phone number of another translator in order for the customer to connect to the other translator, the other translator not being in the conference call holding area.

2. The computer-implemented method of claim 1, further comprising:
  initiating the conference call in order to connect the customer to the available translator.

3. An apparatus, comprising:
  a processor; and
  memory comprising instructions,
  wherein the instructions are configured to cause the processor to
    receive a request to connect a translator to a conference call holding area;
    transmit a request to the translator for a personal identification number prior to connecting the translator to the conference call holding area; and
    receive a message comprising the personal identification number of the translator;
  transmit a request for verification to a verification unit in order to verify the translator; and
    receive a verification from the verification unit;
  receive a message from a customer to connect to a conference call; and
    request that the customer select a language in order to select the translator;
    based on the selected language, determine whether the translator is available among a plurality of translators;
    connect the translator in the conference call holding area;
  when the translator is not available, transmit a message to the customer to inform that the translator is not available, wherein the message comprises a phone number of another translator in order for the customer to connect to the other translator, the other translator not being in the conference call holding area.

4. The apparatus of claim 3, wherein the instructions are further configured to cause the processor to:
initiate the conference call in order to connect the customer to the available translator.

5. A computer program embodied on a non-transitory computer readable medium, the computer program configured to cause a processor to:
receive a request to connect a translator to a conference call holding area;
transmit a request to the translator for a personal identification number prior to connecting the translator to the conference call holding area; and
receive a message comprising the personal identification number of the translator;
transmit a request tor verification to a verification unit in order to verify the translator; and
receive a verification from the verification unit;
receive a message from a customer to connect to a conference call; and
request that the customer select a language in order to select the translator;
based on the selected language, determine whether the translator is available among a plurality of translators;
connect the translator in the conference call holding area;
when the translator is not available, transmit a message to the customer to inform the customer that the translator is not available, wherein the message comprises a phone number of another translator in order for the customer to connect to the other translator, the other translator not being in the conference call holding area.

6. The computer program of claim 5, further comprising:
initiate the conference call in order to connect the customer to the available translator.

* * * * *